United States Patent
Nakano et al.

(10) Patent No.: US 8,359,439 B2
(45) Date of Patent: Jan. 22, 2013

(54) BACKUP APPARATUS, BACKUP METHOD, AND FILE READING APPARATUS

(75) Inventors: Takahiro Nakano, Yokohama (JP);
Keiichi Matsuzawa, Yokohama (JP);
Naohiro Fujii, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 786 days.

(21) Appl. No.: 12/071,267

(22) Filed: Feb. 19, 2008

(65) Prior Publication Data

US 2009/0150628 A1 Jun. 11, 2009

(30) Foreign Application Priority Data

Dec. 11, 2007 (JP) ................................. 2007-319801

(51) Int. Cl.
| G06F 12/00 | (2006.01) |
|---|---|
| G06F 13/00 | (2006.01) |
| G06F 13/28 | (2006.01) |
| G06F 7/00 | (2006.01) |
| G06F 17/00 | (2006.01) |
| G06F 17/30 | (2006.01) |

(52) U.S. Cl. ......... 711/162; 711/112; 707/644; 707/724
(58) Field of Classification Search .................. 711/112, 711/162, E12.001; 707/644, 724
See application file for complete search history.

(56) References Cited

U.S. PATENT DOCUMENTS

| 5,761,692 | A | * | 6/1998 | Ozden et al. ...................... 711/4 |
|---|---|---|---|---|
| 7,206,795 | B2 | | 4/2007 | Bono | |
| 7,254,671 | B2 | * | 8/2007 | Haswell ........................ 711/112 |
| 2003/0026186 | A1 | * | 2/2003 | Ando et al. ................. 369/53.24 |
| 2003/0145248 | A1 | * | 7/2003 | McNeil ............................. 714/13 |
| 2005/0138091 | A1 | * | 6/2005 | Bono ............................ 707/205 |
| 2005/0166012 | A1 | * | 7/2005 | Liu et al. ....................... 711/112 |
| 2007/0143536 | A1 | * | 6/2007 | Sidhu et al. .................... 711/112 |

OTHER PUBLICATIONS

"Design and Implementation of the Second Extended Filesystem", Proceedings of the First Dutch International Symposium on Linux, ISBN 90-36 0385-9, 10 pages. Nov. 28, 2007 (http://web.mit.edu/tytso/www/linux/ext2intro.html).

Hennessey, J. et al., "Chapter 7 (Storage Systems", Computer Architecture a Quantitative Approach, Third Edition (ISBN 1-55860-724-2), Elsevier, pp. 678-692.

"Cheetah 10K.7FC Product Manual", Seagate Technology LLC, Nov. 28, 2007, pp. v-x and 1-92 (http://www.seagate.com/Staticfiles/support/disc/manuals/enterprise/cheetah/10K.7/FC/100260916d.pdf).

* cited by examiner

*Primary Examiner* — Michael Alsip
(74) *Attorney, Agent, or Firm* — Volpe and Koenig, P.C.

(57) ABSTRACT

Proposed are a backup apparatus and a backup method capable of improving the backup performance, as well as a file reading apparatus capable of improving the file reading performance. As a result of determining a read sequence upon reading the respective files from a disk device based on a physical address of the respective storage areas storing data of each of the files in the disk device, and sequentially reading data of each of the files from the disk device according to the determined read sequence, overhead such as the head seek and rotational delay in the disk device upon reading a plurality of files from such disk device can be dramatically reduced.

4 Claims, 11 Drawing Sheets

| FILE NAME/DIRECTORY NAME | SIZE | TOP BLOCK ADDRESS |
|---|---|---|
| /data/aaa | 1024byte | 528 (BL3) |
| /data/bbb/ccc/ddd | 500byte | 104 (BL5) |
| /data/bbb/eee/fff | 2048byte | 520 (BL2) |
| /data/ggg | 120byte | 1112 (BL4) |
| /data/hhh | 4000byte | 512 (BL1) |

| FILE NAME/DIRECTORY NAME | SIZE | TOP BLOCK ADDRESS | EXPANSION ATTRIBUTE BLOCK ADDRESS |
|---|---|---|---|
| /data/aaa | 1024byte | 528 (BL3) | 640 (BL12) |
| /data/bbb/ccc/ddd | 500byte | 104 (BL5) | 592 (BL14) |
| /data/bbb/eee/fff | 2048byte | 520 (BL2) | 1344 (BL11) |
| /data/ggg | 120byte | 1112 (BL4) | 144 (BL13) |
| /data/hhh | 4000byte | 512 (BL1) | 480 (BL10) |
| 83A | 83B | 83C | 83D 83 |

BACKUP APPARATUS, BACKUP METHOD, AND FILE READING APPARATUS

CROSS REFERENCES

This application relates to and claims priority from Japanese Patent Application No. 2007-319801, filed on Dec. 11, 2007, the entire disclosure of which is incorporated herein by reference.

BACKGROUND

The present invention relates to a backup apparatus and a backup method for backing up a plurality of files stored in a disk device as an auxiliary storage apparatus, as well as to a file reading apparatus for reading such plurality of files from the auxiliary storage apparatus, and, for instance, can be suitably applied to a file server.

In recent years, a file management function referred to as a file system is being loaded in many computer systems. A file system comprises a directory for hierarchically managing files in order to facilitate the management of files of programs and user data. A file system includes a special directory known as a root directory to become the apex of the hierarchy of files and directories, and the files and directories stored in the file system can be traced back from the root directory.

A file system creates, per file, management information referred to as an inode (hereinafter referred to as "file information") that is configured from attribute information such as the file name, creation date, last update date, last referral date and access authority, and address information showing in what position of the storage area provided by the auxiliary storage apparatus the data of such file (file data) is being stored, and manages the respective files based on the file information. The file information of the respective files is stored and retained in a dedicated storage area called a super block that is provided separately from the storage area storing the file data.

The file system also creates, per directory, management information referred to as an inode (hereinafter referred to as "directory information") that is configured from attribute information such as the directory name, creation date, last update date, last referral date and access authority, and internal management information such as the pointer to the inode of the respective files and respective directories existing in that directory, and manages the respective directories based on the directory information. The directory information of the respective directories is also stored and retained in the foregoing super block.

When a file is newly created, a file system creates file information of such file, writes the file information and data into the corresponding storage areas, respectively, and adds a pointer to the file information of such file in the directory information of the directory to which the file was created.

Details of the foregoing system are described in pp. 679-692 of "Computer Architecture A Quantitative Approach," Volume 3 (ISBN 1-55860-724-2), (USA), Co-written by John Hennessy and David Patterson, Elsevier, Chapter 7; Non-Patent Document 2.

SUMMARY

Meanwhile, even if the data volumes of the files existing in the file system are the same, if the data volume per file is small, much time will be required for backing up the file system.

This is because, if the data volume per file is large, it is often the case that the unit storage areas (hereinafter referred to as the "blocks") for storing the file data of that file are allocated sequentially on the disk, and, in such a case, vast amounts of data can be read during the time it takes for the disk to rotate once. In addition, when reading the file data of the file, prefetch is sometimes performed as the sequential access, and in this case overhead such as a rotational delay can be minimized since an optimal head seek can be performed on the disk-side.

In other words, when a file server or the like is to read a file stored in a hard disk drive or the like, it is standard to use a memory area of a fixed size and perform processing of repeatedly reading the file data of such size and repeating such processing until the end of the file. In the foregoing case, the file system is usually equipped with a prefetch function of detecting that the file is being sequentially read, and preliminarily reading the subsequent file data into the memory as well (refer to "Design and Implementation of the Second Extended File System", [online], [searched on Nov. 28, 2007], Internet <http://web.mit.edu/tytso/www/linux/ext2intro.html>; Non-Patent Document 1).

However, if the data volume per file is small (for instance, the data volume per file is smaller than the storage capacity of a single block), the data volume that can be read during the time that the disk rotates once will be small, and, also since the file data of the respective files is often stored in blocks positioned randomly on the disk, overhead such as the head seek and rotational delay of the disk will arise each time a single file is read. This overhead is sometimes equivalent to the read time (for instance, several milliseconds) of a single small file (refer to Non-Patent Document 2). Thus, if the data volume per file is small, there is a problem in that the reading performance and backup performance of files will deteriorate enormously.

Further, the specification of U.S. Pat. No. 7,206,795 (Patent Document 1) discloses technology for improving the reading performance of files by using a multisled and reading the files in parallel. Nevertheless, even when using a multisled, the disk-side is only able to read the blocks successively, and, if the respective files are stored in random positions on the disk, head seek and rotational delay will be repeated, and there is a problem in that this overhead becomes dominant and prevents the improvement in the reading performance and backup performance of files.

The present invention was made in view of the foregoing points. Thus, an object of the present invention is to propose a backup apparatus and a backup method capable of improving the backup performance, as well as a file reading apparatus capable of improving the file reading performance.

In order to achieve the foregoing object, the present invention provides a backup apparatus for backing up a plurality of files stored in a disk device. This backup apparatus comprises a read sequence determination unit for determining a read sequence upon reading each of the files from the disk device based on a physical address of the respective storage areas storing data of each of the files in the disk device, a data reading unit for sequentially reading data of each of the files from the disk device according to the read sequence determined with the read sequence determination unit, and a data transfer unit for transferring data of each of the files read from the disk device by the data reading unit to a backup destination.

Consequently, overhead such as the head seek and rotational delay in the disk device upon reading a plurality of files from such disk device can be dramatically reduced.

The present invention additionally provides a backup method for backing up a plurality of files stored in a disk device. This backup method comprises a first step for determining a read sequence upon reading each of the files from the disk device based on a physical address of the respective storage areas storing data of each of the files in the disk device, a second step for sequentially reading data of each of the files from the disk device according to the determined read sequence, and a third step for transferring data of each of the files read from the disk device to a backup destination.

Consequently, overhead such as the head seek and rotational delay in the disk device upon reading a plurality of files from such disk device can be dramatically reduced.

The present invention further provides a file reading apparatus for sequentially reading a plurality of files stored in a disk device. This file reading apparatus comprises a read sequence determination unit for determining a read sequence upon reading each of the files from the disk device based on a physical address of the respective storage areas storing data of each of the files in the disk device, and a data reading unit for sequentially reading data of each of the files from the disk device according to the read sequence determined with the read sequence determination unit.

Consequently, overhead such as the head seek and rotational delay in the disk device upon reading a plurality of files from such disk device can be dramatically reduced.

According to the present invention, since it is possible to improve the reading speed upon reading a plurality of files from the disk device, the backup performance of the backup apparatus and the file reading performance of the file reading apparatus can be improved.

DESCRIPTION OF DRAWINGS

FIG. 9 is a conceptual diagram showing a backup list according to the second embodiment;

DETAILED DESCRIPTION

An embodiment of the present invention is now explained in detail with reference to the attached drawings.

Figure 1:
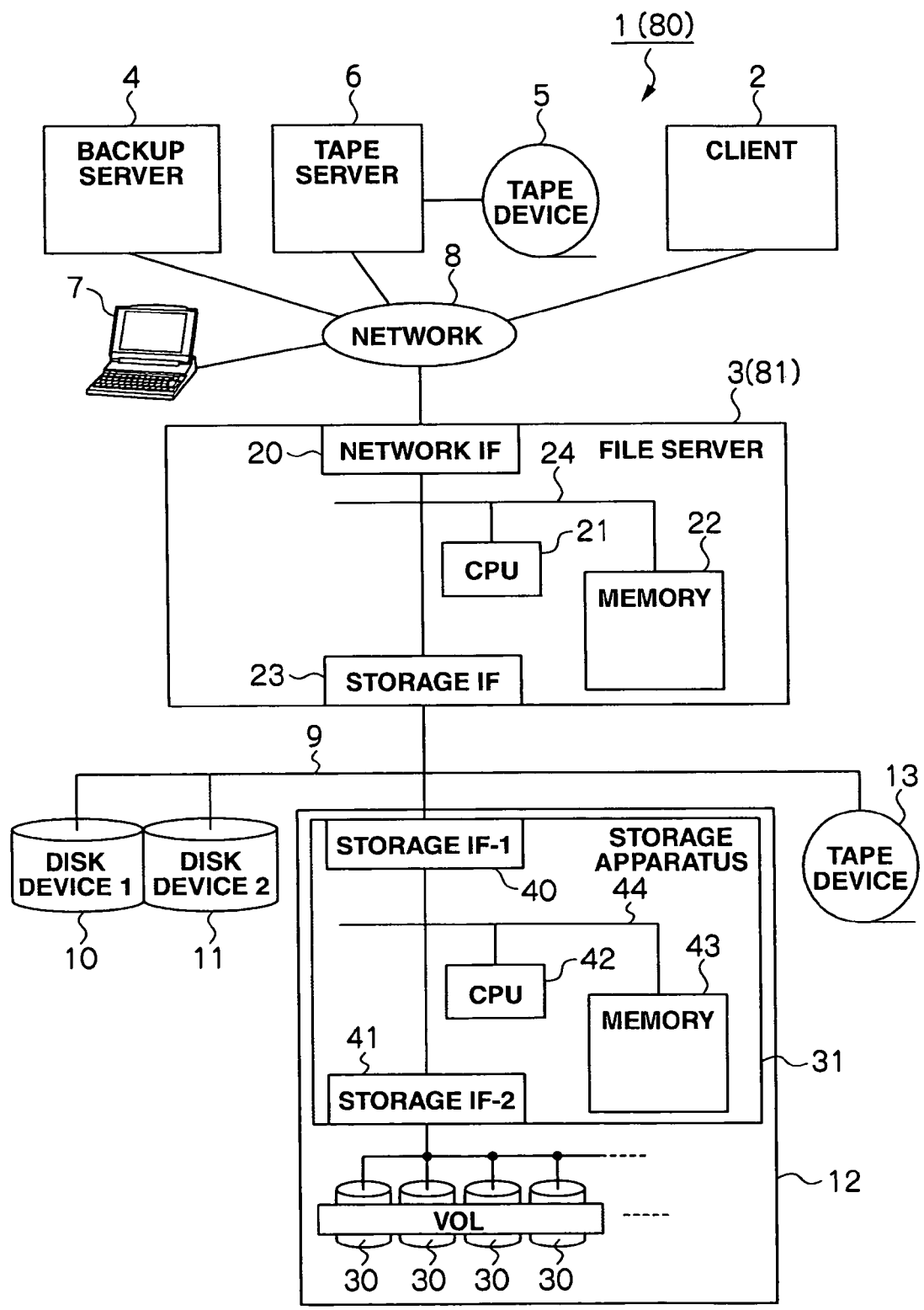
FIG. 1 is a block diagram showing a schematic configuration of a computer system applying the present invention.

(1) First Embodiment (1-1) Configuration of Computer System in Present Embodiment FIG. 1 shows the overall computer system 1 according to the present embodiment. The computer system 1 is configured by a client 2, a file server 3, a backup server 4, a tape server 6 connected to a tape device 5, and a management terminal apparatus 7 being connected via a network 8, and disk devices 10, 11, a storage apparatus 12, and a tape device 13 being connected to the file server 3 via a storage bus 9.

The client 2 is a terminal to be used by the user for requesting file access to the file server 3, and comprises information processing resources such as a CPU (Central Processing Unit) and a memory. Specifically, the client 2 is configured from a personal computer, a workstation, a mainframe or the like.

The file server 3 is a server for providing file access service upon receiving a file access request from the client 2, and comprises a network interface 20, a CPU 21, a memory 22, a storage interface 23, and an internal bus 24 that mutually connects the foregoing components.

The network interface 20 is configured from a network interface card such as an Ethernet (registered trademark) interface card or a wireless LAN (Local Area Network) interface card compatible with various communication speeds (10 Gbps or 1 Gbps), and functions as a data I/O adapter for connecting the file server 3 to the client 2, the backup server 4 and the tape server 6.

Figure 2:
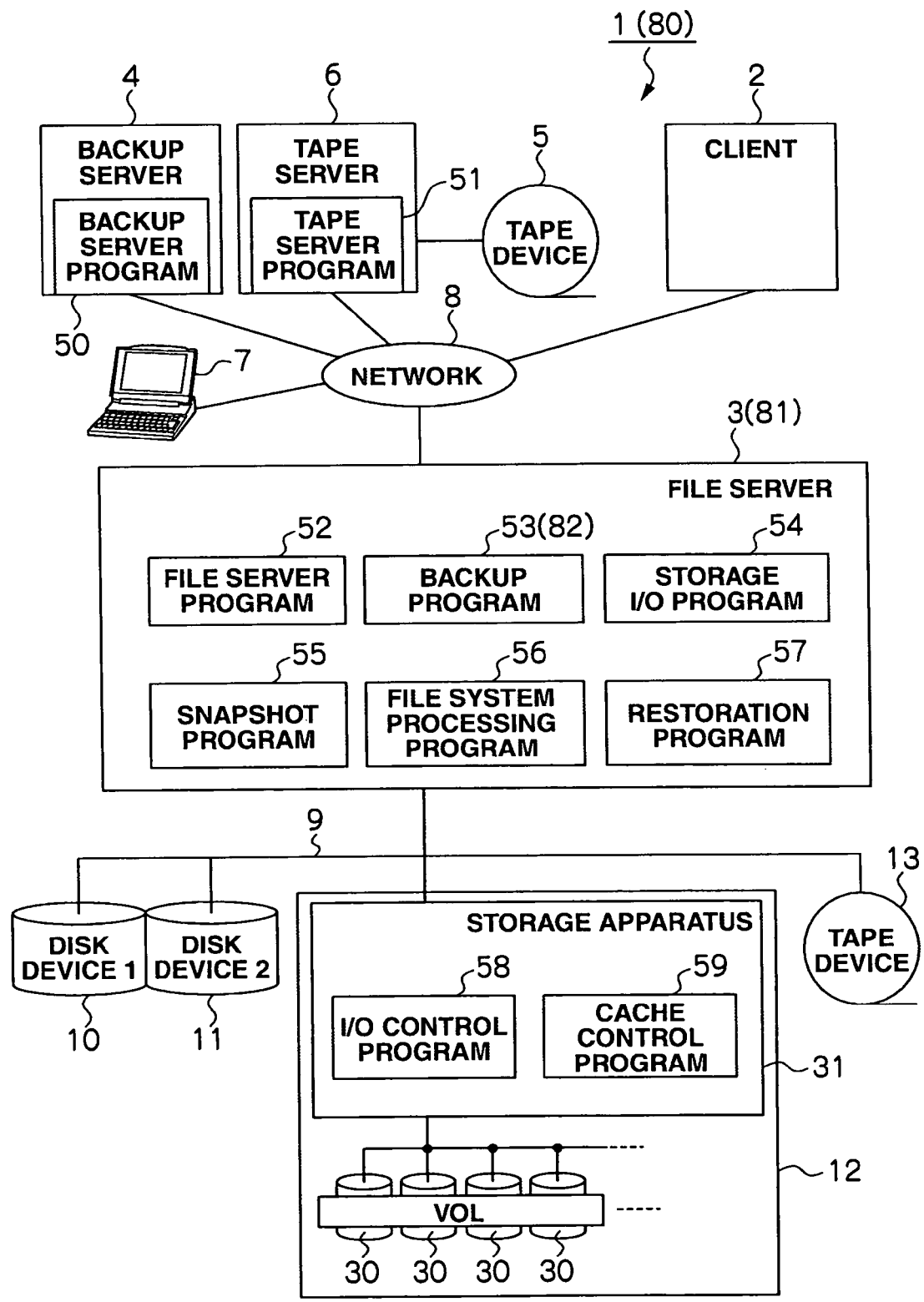
FIG. 2 is a block diagram showing the software configuration of the computer system.

The CPU 21 is a processor that governs the operational control of the overall file server 3, and executes various types of control processing based on the control programs stored in the memory 22. The memory 22 is primarily used for retaining control programs and management tables. The file server program 52, the backup program 53, the storage I/O program 54, the snapshot program 55, the file system processing program 56, and the restoration program 57 described later with reference to FIG. 2 are also retained in the memory 22.

The storage interface 23 is configured from a SCSI (Small Computer System Interface) interface card, an FC (Fibre Channel) interface card, a USB (Universal Serial Bus) interface card, an IEEE (The Institute of Electrical Electronics Engineers) 1394 interface card or the like, and functions as a data I/O adapter for connecting the file server 3 to the disk devices 10, 11, the storage apparatus 12 and the tape device 13.

The backup server 4, the tape server 6 and the management terminal apparatus 7 comprise information processing resources such as a CPU and a memory, and, for instance, are configured from a personal computer, a workstation, a mainframe or the like.

Among the above, the backup server 4 is a server for managing the backup and restoration of data stored in the disk devices 10, 11 and the storage apparatus 13, and issues a backup request or a restoration request to the file server 3 in accordance with the backup execution command or the restoration execution command given from the management terminal apparatus 7.

The tape server 6 is a server for controlling the I/O of data to and from the connected tape device 5, and comprises a storage interface for exchanging data with the tape device 5. The management terminal apparatus 7 is a terminal device to be used by the administrator for managing the computer system 1, and issues a backup execution command or a restoration execution command to the backup server 4 according to the operations input by the administrator.

The network 8 is a communication path for enabling the data transfer among the client 2, the file server 3, the backup server 4, the tape server 6 and the management terminal apparatus 7, and, for instance, is configured from a LAN, a telephone line, or a dedicated line. When a LAN is to be used as the network 8, a LAN that is compliant with the IEEE802.3 or IEEE802.11 standard is generally used.

The storage bus 9 is a communication path for exchanging data between the file server 3 and the first and second disk devices 10, 11, the storage apparatus 12 and the tape device 13, and, for instance, is configured from a SCSI bus, an FC bus, a USB bus or an IEEE1394 bus.

The disk device 10 is a storage apparatus for providing a storage area to the client 2 for storing data of the file system. Data of the file system created by the client is stored in the storage area provided by the disk device 10. The disk device 11 is also used for creating a snapshot of the storage area provided by the disk device 10. The tape devices 5, 13 are storage apparatuses for recording the backup data of the file system stored in the disk device 10 and the storage apparatus 12 onto a magnetic tape, and reproducing such backup data.

In the ensuing explanation, let it be assumed that the disk devices 10, 11 are hard disk drives having the same basic structure as the "magnetic disks" described in Section 7.2 of Non-Patent Document 2 described above, and the tape devices 5, 13 are magnetic tape read/write devices having the same basic structure as the "magnetic tapes" or "automated tape libraries" described in Section 7.2 of Non-Patent Document 2.

The storage apparatus 12 is configured from a plurality of disk devices 30, and a controller 31 for controlling the disk devices 30.

The disk device 30, for instance, is configured from an expensive disk drive such as an FC disk, or an inexpensive disk drive such as a SATA (Serial AT Attachment) disk. A single RAID (Redundant Array of Inexpensive Disks) group is configured from a prescribed number (four, for instance) of disk devices 30, and one or more logical volumes VOL are defined in the storage area provided by the respective disk devices 30 configuring the single RAID group. Data of the file system is read from and written into the volumes VOL in block units.

The controller 31 comprises first and second storage interfaces 40, 41, a CPU 42, a memory 43, and an internal bus 44 for mutually connecting the foregoing components. The first and second storage interfaces 40, 41 have the same function as the storage interface 23 of the file server 3. The CPU 42 is a processor that governs the operational control of the overall storage apparatus 12, and executes necessary control processing based on the various commands given from the file server 3 and the various programs stored in the memory 43. The memory 43 is primarily used for retaining various programs and various management tables. The I/O control program 58 and the cache control program 59 described later with reference to FIG. 2 are also retained in the memory 43.

FIG. 2 shows the software configuration of the computer system 1. As shown in FIG. 2, the backup server 4 is loaded with a backup server program 50. The backup server program 50 designates the file or file system provided by the file server program 52 of the file server 3 and requests the backup thereof to the backup program 53 of the file server 3 and requests the restoration of the designated file or file system to the restoration program 57 of the file server 3 according to the backup execution command and the restoration execution command given from the management terminal apparatus 7.

The tape server 6 is loaded with a tape server program 51. The tape server program 51, by controlling the tape device according to commands from the backup server program 50, is able to record the backup data sent from the backup program 53 of the file server 3 on a magnetic tape via the tape device 5, and read the designated data from the magnetic tape via the tape device 5 and send such data to the restoration program 57 of the file server 3.

Meanwhile, the file server 3 is loaded with a file server program 52, a backup program 53, a storage I/O program 54, a snapshot program 55, a file system processing program 56, and a restoration program 57.

The file server program 52 provides to the client 2 the storage area provided by the disk device 10 or the storage apparatus 12 connected to the file server 3, and provides the function of accessing the file system stored in the storage area via the file system processing program 56 according to the file access request from the client 2.

The backup program 53 provides a function of backing up the data of the file system designated by the backup server program 50 of the backup server 4 on a magnetic tape via the designated tape device 5, 13. The backup program 53 also provides a function of creating a snapshot of the file or file system stored in the disk device 10 or the storage apparatus 12 by starting the snapshot program 55 as required, and backing up such snapshot on a magnetic tape via the tape devices 5, 13.

The storage I/O program 54 provides a function of inputting and outputting data by controlling the storage interface 23 (FIG. 1) of the file server 3 when the backup program 53 or the restoration program 57 is to access the tape device 13, or when the file system processing program 56 is to access the disk device 10.

The snapshot program 55 provides a function of creating a snapshot of the file system stored in the disk device 10 or the storage apparatus 12 when a snapshot creation command is issued from the backup program 53 or the like. Since a snapshot retains the file data at the point in time that the snapshot was created, no matter how much time is spent for the backup process, it is possible to back up the status at the time the snapshot was created.

As methods of creating a snapshot of the file or file system stored in the disk device 10, there are, for example, a copy method of copying data stored in the disk device 10 to another disk device 11 at the point in time the snapshot creation command was issued; a dual writing/partitioning method of dual writing data in the disk device 10 and the disk device 11, stopping the writing of data into the disk device 11 at the point in time the snapshot creation command is issued, and subsequently writing data only into the disk device 10; and a copy-on-write differential snapshot method of saving and storing data in a state before it is rewritten in the disk device 11 when initially writing data in a block of the disk device 10 after the snapshot creation command is issued. The same methods can be employed when creating a snapshot of the file or file system stored in the storage apparatus 12.

The file system processing program 56 manages the file information of the respective files and the directory information of the respective directories that exist in the file system. The file system processing program 56 realizes the access to files by converting the file access request designating the file name into an I/O request of block data designating the top block address and the file size of such file based on the file information and the directory information.

The restoration program 57 performs restoration processing of restoring (recovering) data of the file system backed up on the magnetic tape by the backup program 53 via the tape devices 5, 13 to the original disk devices 10, 11 and the storage apparatus 12.

Meanwhile, the storage apparatus 12 is loaded with an I/O control program 58 and a cache control program 59.

The I/O control program 58 controls the I/O of the first storage interface 40 of the storage apparatus 12 as though one or more disk devices 30 (FIG. 1) are logically connected through the storage bus 9. The I/O control program 58 performs processing for controlling the second storage interface 41 of the storage apparatus 12 and operating the plurality of disk devices 30 mounted on the storage apparatus 12 according to a RAID format.

The cache control program 59 controls the I/O of data to and from the cache area in the memory 43 (FIG. 1) of the storage apparatus 12 for speeding up the processing of the I/O control program 58. For example, when a data I/O request (write request or read request) to the same logical volume is successively issued, the cache control program 59 causes the data I/O to the logical volume in a size that is larger than the current data size, and temporarily accumulates data in the foregoing cache area. If data subject to the I/O request from the file server 3 exists in the foregoing cache area, the cache control program 59 does not access the logical volume, and executes I/O processing using the data in the cache area.

In the ensuing explanation, although the processing subject of the various types of processing is explained as a "program," it goes without saying that in reality the CPU in the backup server 4, the tape server 6, the file server 3 or the storage apparatus 12 performs the corresponding processing based on such "program."

(1-2) Backup Method in Present Embodiment

The backup method of a file system in the computer system 1 according to the present embodiment is now explained.

When backing up a file system stored in the disk device 10 in the computer system 1, the administrator operates the management terminal apparatus 7, and issues to the backup server 4 a backup execution command designating the top directory and backup destination of the file system to be backed up.

The backup server program 50 of the backup server 4 that received the backup execution command sends a backup request storing similar information to the file server 3. The backup program 53 of the file server 3 that received the backup request sequentially sends a read request per file and directory existing in the designated file system to the disk device 10.

The disk device 10 that received the read request sequentially reads the file information and file data of the file when the read target designated in the read request is a file, and reads the directory information of the directory when the read target is a directory, and sends such information and data as backup data to the file server 3. Consequently, the backup data is thereafter backed up on a magnetic tape by being transferred to the tape devices 5, 13 or the like of the backup destination according to the backup program 53 of the file server 3.

In the foregoing case, when the backup program 53 of the file server 3 is to send a file read request to the disk device 10, the computer system 1 of this embodiment is characterized in that a read sequence upon reading the respective files from the disk device 10 is determined, and the file data of the respective files is read from the disk device 10 according to the determined read sequence based on the physical address of the storage areas respectively storing the file data of the respective files in the disk device 10.

Figure 3:
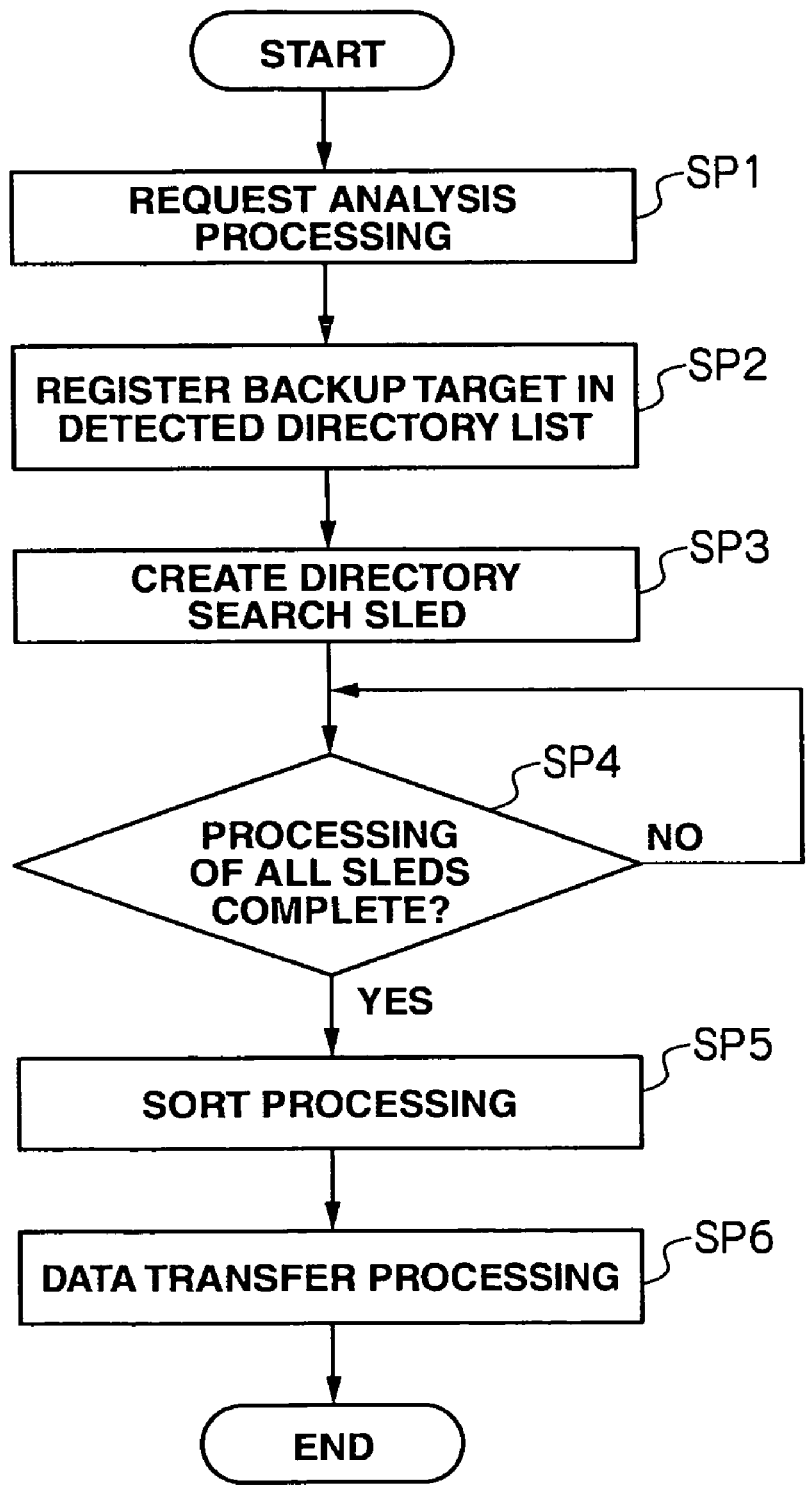
FIG. 3 is a flowchart showing the processing routine of backup processing according to the first embodiment.

FIG. 3 shows the specific processing contents of the backup program 53 concerning the foregoing backup processing.

When the backup program 53 receives the foregoing backup request from the backup server program 50 of the backup server 3, it starts the backup processing shown in FIG. 3, and foremost analyzes the issued backup request, and confirms the file system to be backed up and the backup destination of such file system (SP1).

Subsequently, the backup program 53 registers the top directory of the file system designated as the backup target in a detected directory list not shown (SP2), and thereafter creates a plurality of sleds (hereinafter referred to as "directory search sleds") for searching the files and directories existing in the directory (SP3). The number of directory search sleds to be created may be a fixed value such as four, or may be changed according to the number of files and directories to be backed up.

Subsequently, the backup program 53 waits for all directory search sleds to complete the search processing (hereinafter referred to as the "directory search processing") of files and directories existing in the file system designated as the backup target (SP4).

Here, the respective directory search sleds are searching within the file system (directory) designated as the backup target as described later, and, upon detecting a file or a directory, they register such file or directory in the backup list 60 shown in FIG. 4.

The backup list 60 is a list for registering the files and directories detected in the foregoing search, and comprises a file name/directory name column 60A, a size column 60B, and a top block address column 60C. The file name/directory name column 60A stores the name of the files and directories detected in the search of the file system to be backed up as described later. The size column 60B stores the total size of file data and file information of that file when the entry corresponds to a file, and stores the size of directory information when the entry corresponds to a directory. The top block address column 60C stores the physical address of the top block (hereinafter referred to as the "top block address") of the storage area storing the file when the entry corresponds to a file, and stores the maximum value of the block address when the entry corresponds to a directory.

Figure 4:
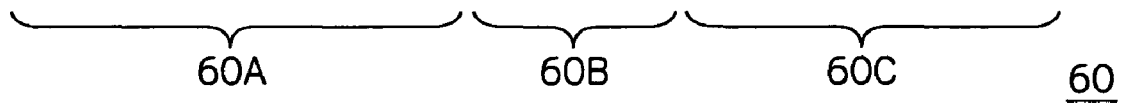
FIG. 4 is a conceptual diagram showing a backup list according to the first embodiment.

Accordingly, the example illustrated in FIG. 4 shows that the foregoing search detected a file having a file name of "/data/aaa" and a size of "1024 bytes," and the top block address of that file is "528."

When the backup program 53 receives a notice (hereinafter referred to as the "directory search processing completion notice") from all directory search sleds indicating that the directory search processing is complete, it executes sort processing of rearranging the entries of the backup list 60 in order from the entry having the smallest top block address stored in the top block address column 60C (SP5).

As the processing algorithm to be used during the foregoing sort processing, it is desirable to use a sorting method such as a merge sort method that is generally considered to be efficient. In addition, as described above, although the maximum value of the block address is stored as the top block address when the entry corresponds to a directory, if the value of the top block address is the same as in the foregoing case, the entries can also be rearranged according to the alphabet or number of the path name of the corresponding file or directory.

Subsequently, the backup program 53 reads information of the top entry among the entries registered in the backup list 60 subject to the sort processing, and sends the read request of the file or directory corresponding to that entry to the disk device 10. The backup program 53 executes similar processing according to the alignment sequence of the entries regarding all entries of the backup list 60.

Consequently, the backup data concerning the files and directories existing in the file system to be backed up is read from the disk device 10 in order from the file having the smallest top block address and then given to the file server 3. The backup program 53 transfers the obtained file data of the respective files to the tape server 6 or the tape device 13 connected to the tape device 5 of the backup destination via the storage I/O program 54 (SP6). The file data of the files is thereby sequentially backed up on the magnetic tape designated in the backup request via the tape devices 5, 13.

When the backup program 53 eventually completes the execution of processing of all entries in the backup list 60, it sends a notice indicating that the backup is complete to the backup server 4, and thereafter ends this backup processing.

Figure 5:
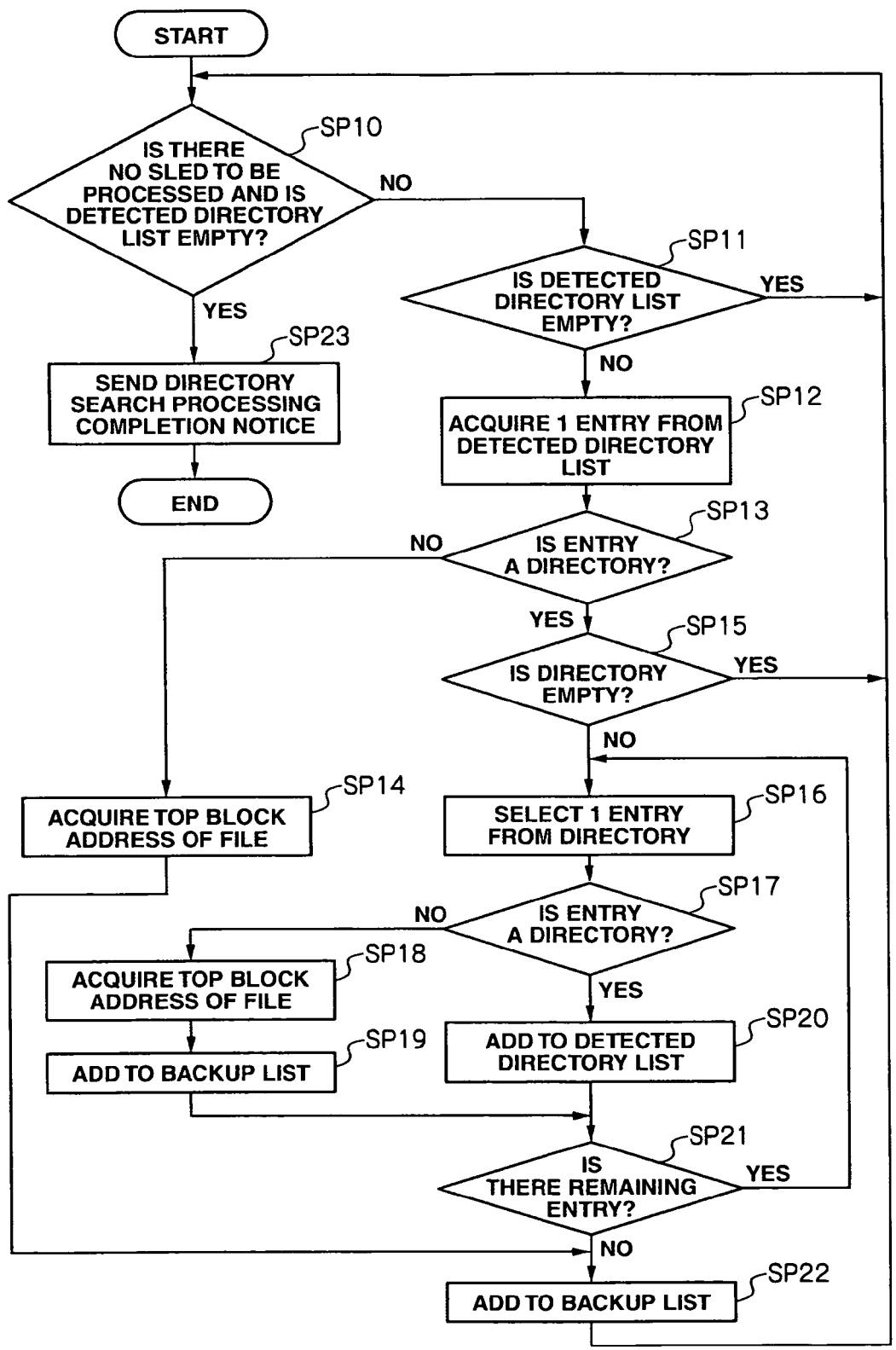
FIG. 5 is a flowchart showing the processing routine of directory search processing.

The specific processing contents of the directory search processing to be performed by the respective directory search sleds created at step SP3 of the backup processing are shown in FIG. 5.

When the respective directory search sleds are created with the backup program 53, they start the directory search processing shown in FIG. 5, and foremost determine whether there is currently no directory search sled that is executing the directory search processing, and whether the detected directory list is empty (whether a file or directory is not listed in the detected directory list) (SP10).

If the directory search sled obtains a negative result in this determination, it determines once again whether the detected directory list is empty, and returns to step SP10 upon obtaining a positive result in this determination. The directory search sled thereafter repeats the same processing until it obtains a positive result at step SP10 or obtains a negative result at step SP11 (SP10-SP11-SP10).

Meanwhile, if the directory search sled obtains a negative result at step SP11, it extracts one entry from the detected directory list (SP12), and determines whether the extracted entry is an entry that corresponds to a directory (SP13).

To obtain a negative result in this determination implies that the backup target designated in the backup request from the backup server 4 is a file. Here, the directory search sled makes an inquiry to the file system processing program 56 (FIG. 2) regarding the top block address of the corresponding file (SP14), stores the file name and file size of the file as well as the top block address of the file obtained at step SP14 in the backup list 60 (in other words, registers that file in the backup list) (SP22), and thereafter returns to step SP10.

Contrarily, to obtain a positive result in the determination at step SP13 implies that the backup target designated in the backup request from the backup server 4 is a part or all of the file system. Here, the directory search sled determines whether the directory corresponding to the entry acquired at step SP12 is empty (SP15).

If the directory search sled obtains a positive result in this determination it returns to step SP10, and if the directory search sled contrarily obtains a negative result in this determination it selects one entry (file or directory) in that directory (SP16). Then the directory search sled determines whether the selected entry is a directory (SP17).

If the directory search sled obtains a negative result in this determination, it acquires the top block address of the file as with the processing at step SP14 (SP18), and registers that file in the backup list 60 (SP19). If the directory search sled contrarily obtains a positive result in the determination at step SP17, it registers that directory in the detected directory list (SP20).

The directory search sled thereafter determines whether there is any unprocessed entry (file or directory) in the directory corresponding to the entry selected at step SP12 (SP21), and returns to step SP16 upon obtaining a negative result in this determination. In addition, the directory search sled thereafter repeats the same processing until it obtains a negative result at step SP21 (SP16 to SP21-SP16).

When the directory search sled eventually obtains a negative result at step SP21 as a result of completing the processing of all files or directories existing in the directory corresponding to the entry acquired from the detected directory list at step SP12, it adds that directory to the backup list 60 (SP22). Here, the directory search sled sets the top block address of that directory as the maximum value of the block address.

Subsequently, the directory search sled returns to step SP10, and thereafter repeats the same processing until it obtains a positive result at step SP10 (SP10 to SP22-SP10). When the directory search sled eventually obtains a positive result at step SP10 as a result of completing the registration of all files and directories in the file system to be backed up in the backup list 60, is sends the foregoing directory search processing completion notice to the backup program 53 (FIG. 2) (SP23), and thereafter ends this directory search processing.

How data is read from the disk device 10 in the foregoing backup processing is now explained with reference to FIG. 4 and FIG. 6.

Figure 6:
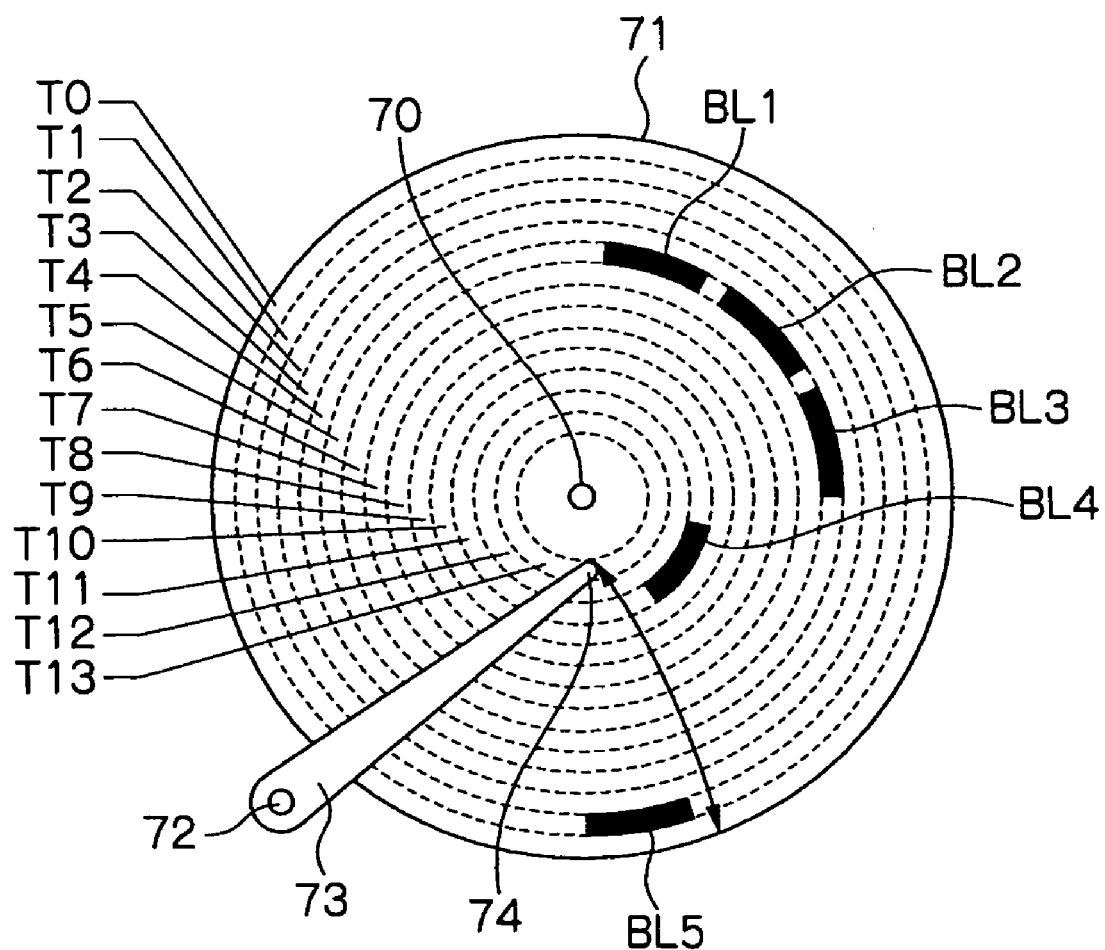
FIG. 6 is a conceptual diagram explaining the operation of a corresponding hard disk drive in a disk device or a storage apparatus during backup processing according to the first embodiment.

FIG. 6 schematically shows the internal structure of a standard hard disk drive. As shown in FIG. 6, the hard disk drive comprises a magnetic disk 71 that rotates at a fixed rotation speed around an axis 70 with a first spindle motor not shown.

The hard disk drive is also provided with an arm 70 that is supported so as to be able to rotate around an axis 72 with a second spindle motor not shown. A magnetic head 74 is fixed at the tip of the arm 73 so as to face the magnetic disk 71 with spacing in between. As a result of controlling the second spindle motor, it is possible to move the magnetic head 74 to the intended track T0 to T13 among a plurality of tracks T0 to T13 formed concentrically on the surface of the magnetic disk 71.

Thereby, with the hard disk drive, it is possible to record data onto an intended track T0 to T13 via the magnetic head 74, or read data recorded on tracks T0 to T13 via the magnetic head 74.

Certain hard disk drives are provided with a plurality of magnetic disks 71, or provided with a magnetic disk 71 that is able to record information on both surfaces thereof. In this example, however, let it be assumed that one magnetic disk 71 is built into the hard disk drive mounted on the disk device 10 or the storage apparatus 12, and information can only be recorded on one surface of the magnetic disk 71 in order to simplify the explanation.

Although Section 4.1 of ("Cheetah 10K.7FC Product Manual", [online], [Seagate Technology LLC], [searched on Nov. 28, 2007], Internet <http://www.seagate.com/Staticfiles/support/disc/manuals/enterprise/cheetah/10K.7/FC/100260916d.pdf>; Non-Patent Document 3) prescribes that 90,744 tracks are formed on the surface of the magnetic disk, the example depicted in FIG. 6 shows a case where 14 tracks are provided. In the ensuing explanation, the outermost track T0 of the magnetic disk 71 is the zeroth track, and the track number will increase by one as the track gets closer to the inner periphery.

With a conventional backup method, since the corresponding files and directories are backed up according to the alignment sequence of the entries in the backup list 60 that has not been subject to sort processing, for instance, when following the backup list 60 that has not been subject to sort processing as shown in FIG. 4, access in the order from block BL3, block BL5, block BL2, block BL4 and block BL1 of FIG. 6 will be required.

This being the case, the disk device 10 will perform the operation of foremost moving to the fifth track T4 and reading data of the block BL3, subsequently moving to the first track T1 and reading data of the block BL5, thereafter moving to the fifth track T5 and reading data of the block BL2, then moving to the eleventh track T11 and reading data of the block BL4, and finally moving to the fifth track T5 and reading data of the block BL1.

Meanwhile, with the backup method according to this embodiment, since backup is performed according to the backup list 60 of FIG. 4 after rearranging the respective entries of the backup list 60 in order from the entry with the smallest top block address, files will be read in the order from block BL5, block BL1, block BL2, block BL3 and block BL4.

In other words, the disk device 10 will perform the operation of moving to the first track T1 and reading data of the block BL5, moving to the fifth track T5 and reading data of the block BL1, the block BL2 and the block BL3, respectively, and thereafter moving to the eleventh track T11 and reading data of the block BL4.

Thus, according to the backup method of this embodiment, since the travel distance of the magnetic head 74 can be reduced in comparison to conventional backup methods, it is possible to reduce the head seek time. Consequently, it is possible to reduce the time required for reading files from the disk device 10, and thereby improve the file reading performance and backup performance of the overall computer system 1.

In addition, according to the backup method of this embodiment, since data can be successively read from the blocks BL1 to BL3 on the same track 5, the seek count can be reduced. Consequently, the time required for reading files from the disk device 10 or the storage apparatus 12 can be shortened even more, and the file reading performance and backup performance of the overall computer system 1 can be improved even further.

Although the foregoing example explained a case of backing up five files, if the number of files to be backed up is in the thousands or ten thousands, the effect of shortening the overall file reading time and backup time by shortening the seek time of the magnetic head 74 will increase even further.

Although the foregoing explanation explained a case where the backup target is a file system stored in the disk device 10, the backup method of this embodiment can be similarly applied to cases when the file system of the backup target is a snapshot. Here, whether the foregoing copy method or dual writing/partitioning method is used as the method for creating a snapshot, the same effect is yielded when backing up a snapshot by applying the backup method of this embodiment.

As other methods of creating a snapshot, there are, for instance, a method of accumulating differential data in another disk device from the time the snapshot was acquired, and a method of creating a snapshot by copying the data before update of the updated section to the hard disk drive. By adopting these snapshot creation methods, the snapshot data to be backed up will be distributed to a plurality of disk devices.

In the foregoing case, since backup is usually executed immediately when a snapshot is acquired, sufficient effect can be yielded so as long as the amount of differential data does not become dominant even if the user rearranges the respective entries in the backup list 60 using the original block address that existed in the disk device for reading and writing data, or even if the user rearranges the respective entries in the backup list 60 by using the block address in the disk device of the migration destination to which the differential data will be migrated.

Even if data of the file system is stored in a logical volume VOL (FIG. 1) provided by the storage apparatus 12, so as long as data is accessed according to the block address order of the logical volume VOL, the same effect can be yielded since the access to the physical disk configuring the logical volume will also be made in the block address order. In addition, with the storage apparatus 12, by making access in the block address order of the logical volume VOL, there are cases where the cache control program 59 will determine this to be a sequential access and perform a sequential prefetch. In the foregoing case, since the probability of the reading of data from the adjacent blocks BL1 to BL3 being collectively performed will increase, a further effect can be expected.

Meanwhile, when restoring data of the file system backed up on the magnetic tape via the tape devices 5, 13 in the computer system 1, the administrator operates the management terminal apparatus 7 to issue a restoration execution command to the backup server 4 designating the backup data to be restored and the location thereof, the restoration destination, and so on.

The backup server program 50 (FIG. 1) of the backup server 4 that received this restoration execution command sends restoration request storing similar information to the file server 3. The restoration program 57 of the file server 3 that received the restoration request sends a data transfer request to the tape devices 5, 13 equipped with the magnetic tape storing the backup data to be restored for transferring such backup data to be restored to the self server (file server 3).

Consequently, the backup data is read from the magnetic tape by the tape devices 5, 13 and sent to the file server 3 according to the data transfer request, and restored in the storage area provided by the disk device 10 or the storage apparatus 12 according to the restoration program 57 (FIG. 2) of the file server 3.

Figure 7:
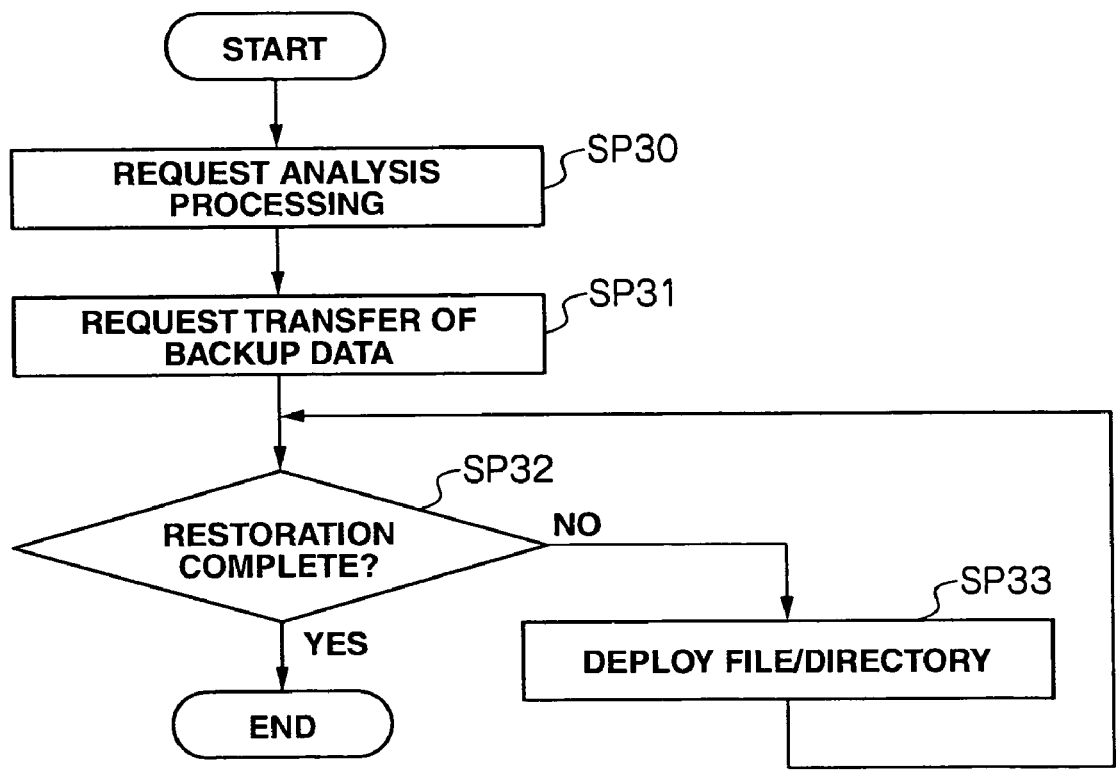
FIG. 7 is a flowchart showing the processing routine of restoration processing.

FIG. 7 shows the specific processing contents of the restoration program 57 of the file server 3 concerning the foregoing restoration processing.

When the restoration program 57 receives the foregoing restoration request from the backup server program 50 (FIG. 2) of the backup server 3, it starts the restoration processing shown in FIG. 7, and foremost analyzes the issued restoration request, and confirms the backup data to be restored and the location thereof, as well as the restoration destination of such backup data (SP30).

Subsequently, the restoration program 57 sends a transfer request of the backup data to be restored as necessary to the tape devices 5, 13 equipped with the magnetic tape storing the backup data (SP31), and thereafter determines whether the restoration is complete (SP32).

If the restoration program 57 obtains a negative result in this determination, it restores the files and directories to the designated restoration destination based on the backup data to be restored transferred from the tape devices 5, 13 (SP33).

Specifically, the restoration program 57 waits to receive the backup data of information of an entry (file or directory) from the tape devices 5, 13. When the restoration program 57 receives information of a single entry, it creates a directory in the restoration destination when that information is directory information (stores that directory information in a corresponding super block). The restoration program 57 registers the directory in a prescribed restoration list not shown so as to enable the subsequent restoration of information such as the creation time in the directory information.

Meanwhile, if the received management information is file information, the restoration program 57 additionally receives the file information and file data of that file from the tape devices 5, 13, writes the file data in the designated restoration destination, and stores the file information in the corresponding super block. Incidentally, the creation time and update time of the file in the file information stored in the super block are the same as the creation time and update time of the file stored during the backup.

If the directory existing on the path of the restored file is registered in the restoration list, the restoration program 57 forms a path from that directory to the file by setting the pointer to the file information of that file in the directory information of the directory, and thereafter deletes the directory from the restoration list.

Subsequently, the restoration program 57 returns to step SP32, and thereafter repeats the same processing (SP32 to SP33-SP32). When the restoration program 57 eventually obtains a positive result at step SP32 as a result of completing the restoration of all files and directories of the restoration target, it ends this restoration processing.

The foregoing processing is no different from the conventionally performed restoration processing. Nevertheless, with the backup method according to this embodiment described above, since the order of the files to be backed up is not the path order of the files, it is not possible to accurately reflect the directory information designed on the premise of backing up the files and directories according to the path order of the files. For example, with the backup method according to this embodiment described above, there are cases where the files in a directory are restored after such directory is restored, and, in such a case, the update time of the directory may be overwritten by the time that the files were restored.

Thus, in this embodiment, a maximum value is set as the top block address of the respective directories at step SP22 of the directory search processing explained with reference to FIG. 5, and the directories are sorted according to the path name when the value of the top block address is the same at step SP5 of the backup processing explained with reference to FIG. 3. Thereby, the directories in the backup list 60 are gathered at the end of the files, and further sorted according to the path name. Thus, accurate directory information can be restored by overwriting the last update time of the directory.

(2) Second Embodiment

FIG. 1 and FIG. 2 show the overall computer system 80 according to the second embodiment. The computer system 80 differs from the computer system 1 (FIG. 1) with respect to the point that the files and directories of the file system respectively include expansion attribute information such as an ACL (Access Control List).

In this case, the expansion attribute information is also distributed and disposed on the magnetic disk 71 (FIG. 6) of the disk drive 10 as with the data of the respective files. Accordingly, even if the files and directories to be backed up are sorted in order from the top block address, for example, if the expansion attribute information of the respective files is stored in a completely different location than the file data of that file, it will be difficult to speed up the backup process.

Thus, in this embodiment, the expansion attribute information is prefetched as a means for overcoming the foregoing problem.

Figure 8:
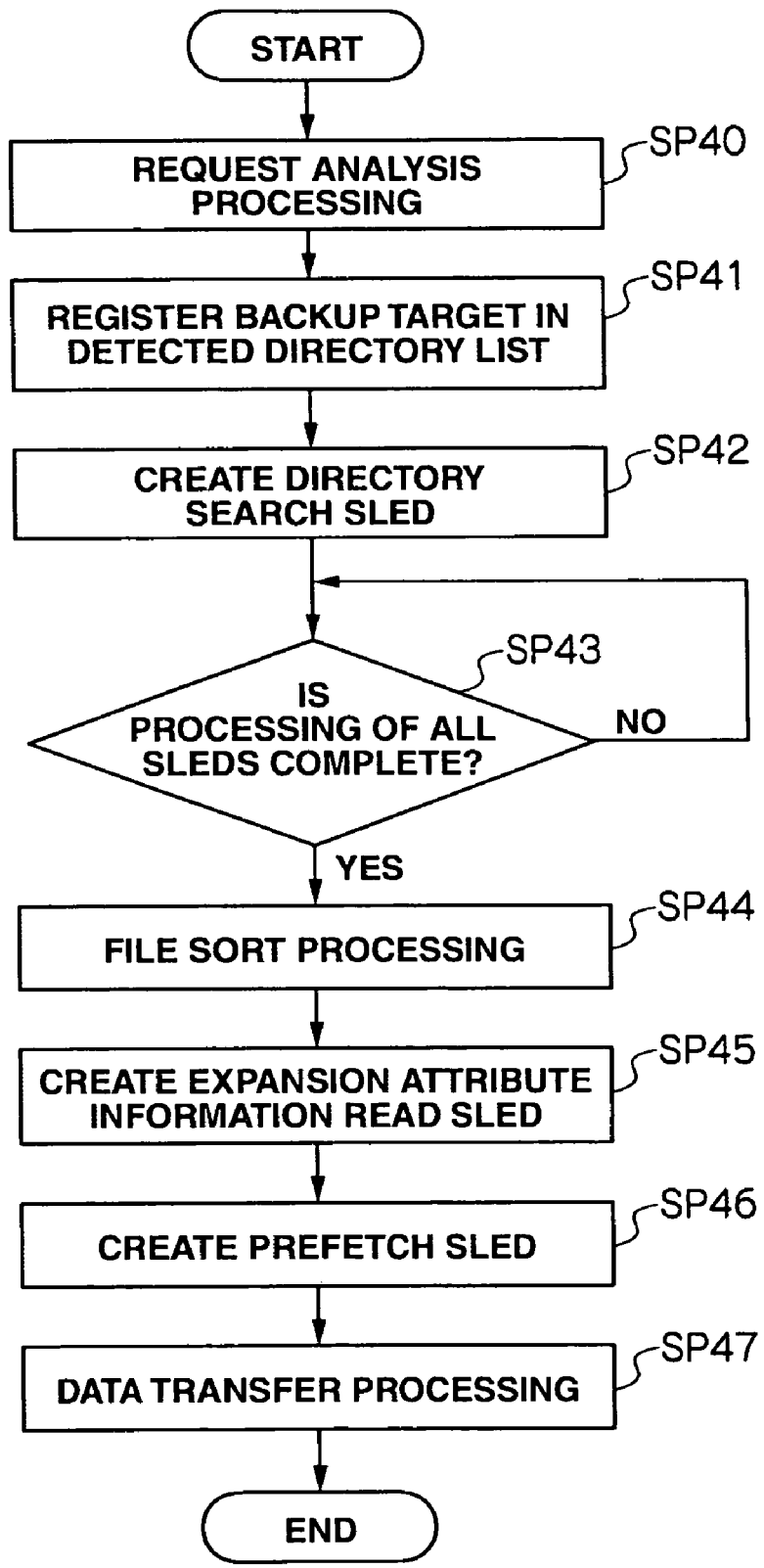
FIG. 8 is a flowchart showing the processing routine of backup processing according to the second embodiment.

FIG. 8 shows the specific processing contents of the backup program 82 (FIG. 2) loaded in the file server 81 (FIG. 2) when backing up a file system in which the files and directories include expansion attribute information.

In other words, when the backup program 82 receives the foregoing backup request from the backup server program 50 of the backup server 4, it starts the backup processing shown in FIG. 8, and creates a backup list 83 as shown in FIG. 9 by performing the processing from step SP40 to step SP43 as with the processing from step SP1 to step SP4 of the backup processing according to the first embodiment explained with reference to FIG. 3.

The backup list 83 is a list for registering the files and directories to be backed which were detected as a result of the respective directory search sleds created at step SP42 searching within the file system (directory) to be backed up. The backup list 83 comprises a file name/directory name column 83A, a size column 83B, a top block address column 83C, and an expansion attribute block address column 83D.

The file name/directory name column 83A, the size column 83B and the top block address column 83C respectively store the name, size and top block address of the file or directory to be backed up which was detected as a result of the search as with the backup list 60 according to the first embodiment explained with reference to FIG. 4. The expansion attribute block address column 83D stores the top block address among the storage areas storing the expansion attribute information of the corresponding file or directory.

Subsequently, the backup program 82 executes sort processing for rearranging the respective entries of the created backup list 83 in order from the entry with the smallest top block address (SP44). As the processing algorithm to be used in the foregoing case, the same sort method as with the processing at step SP5 of the backup processing according to the first embodiment explained with reference to FIG. 3 can be used.

The backup program 82 thereafter creates a plurality of expansion attribute information read sleds (SP45). The created expansion attribute information read sled sequentially issues an expansion attribute information read command to the file system processing program 56 (FIG. 2) so that the expansion attribute information of the respective files and respective directories registered in the backup list 83 is sequentially read according to the alignment sequence of the corresponding entries in the backup list 83. Consequently, the file system processing program 56 sends the read request of the designated expansion attribute information to the disk device 10 according to the foregoing command, and thereby stores the expansion attribute information of the file or directory sent from the disk device 10 in the buffer area of the memory 22.

Subsequently, the backup program 83 creates a plurality of prefetch sleds (SP46). The created prefetch sled sequentially issues a file data read command to the file system processing program 56 so that the file data of the respective files registered in the backup list 83 is sequentially prefetched in the amount of the top block in the alignment sequence of the entries corresponding to the files. Consequently, the file system processing program 56 sends the data read request of the designated top block to the disk device 10, and thereby stores the data of the top block of the file sent from the disk device 10 in the buffer area of the memory 22 according to the foregoing command.

The number of expansion attribute information read sleds to be created at step SP45 and the number of prefetch sleds to be created at step SP46 may respectively be a fixed value such as four, or may be changed according to the number of files and directories to be backed up.

Subsequently, the backup program 83 reads the expansion attribute information of the files and directories to be backed up and the file data stored in the buffer area of the memory 22 from the memory 22 in the alignment sequence of the corresponding entries in the backup list 83, and sequentially transfers such information and data to the tape devices 5, 13 of the backup destination (SP47). When the backup program 83 eventually completes transferring all data, it ends this backup processing.

Figure 10:
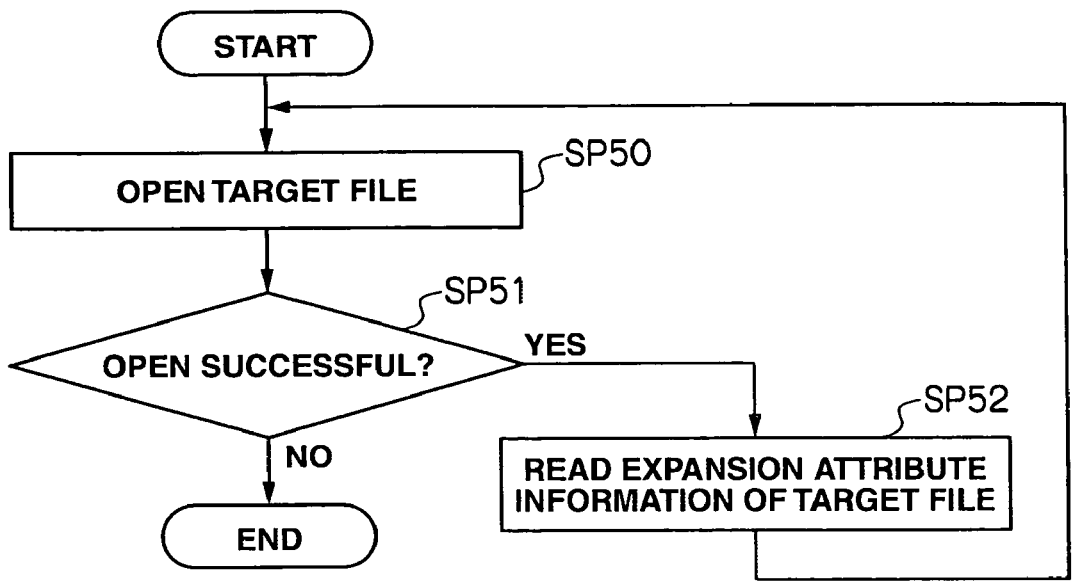
FIG. 10 is a flowchart showing the processing routine of expansion attribute information read processing.

FIG. 10 shows the processing routine of expansion attribute information read processing to be executed by the respective expansion attribute information read sleds created at step SP45 of the backup processing (FIG. 8) according to this embodiment. The expansion attribute information read sled reads the expansion attribute information of the corresponding files and directories from the corresponding disk device 10 according to the processing routine shown in FIG. 10.

In other words, the expansion attribute information read sled foremost refers to the backup list 83 (FIG. 9), and issues a command to the file system processing program 56 for opening the file of the expansion attribute information of the file or directory scheduled to be subject to a data transfer subsequently or after a given count (SP50). The file system processing program 56 that received the foregoing command opens the file of the designated expansion attribute information stored in the disk device 10 by issuing a file open request to the storage I/O program 54.

Subsequently, the expansion attribute information read sled determines whether the opening of the file of the expansion attribute information was successful (SP51), and, upon obtaining a positive result in this determination, issues a command to the file system processing program 56 for reading the expansion attribute information (SP52). The file system processing program 56 that received the foregoing command causes the disk device 10 to read the data of the file of the designated expansion attribute information and store the read data into the buffer area secured n the memory 22 by issuing a data read request to the storage I/O program 54.

Subsequently, the expansion attribute information read sled returns to step SP50, and repeats the same processing until it obtains a negative result at step SP51 (SP50 to SP52-SP50). The expansion attribute information of the respective files and directories registered in the backup list 83 is thereby sequentially read according to the alignment sequence of the corresponding entries in the backup list 83 and stored in the buffer area of the memory 22. This is then sequentially transferred to the tape devices 5, 13 of the backup destination according to the backup program 82 at step SP47 of the backup processing explained with reference to FIG. 8.

The expansion attribute information read sled ends this expansion attribute read processing when the opening of the file of the expansion attribute information ends in a failure as a result of the reading of the expansion attribute information of all files and all directories registered in the backup list 83 being complete.

Figure 11:
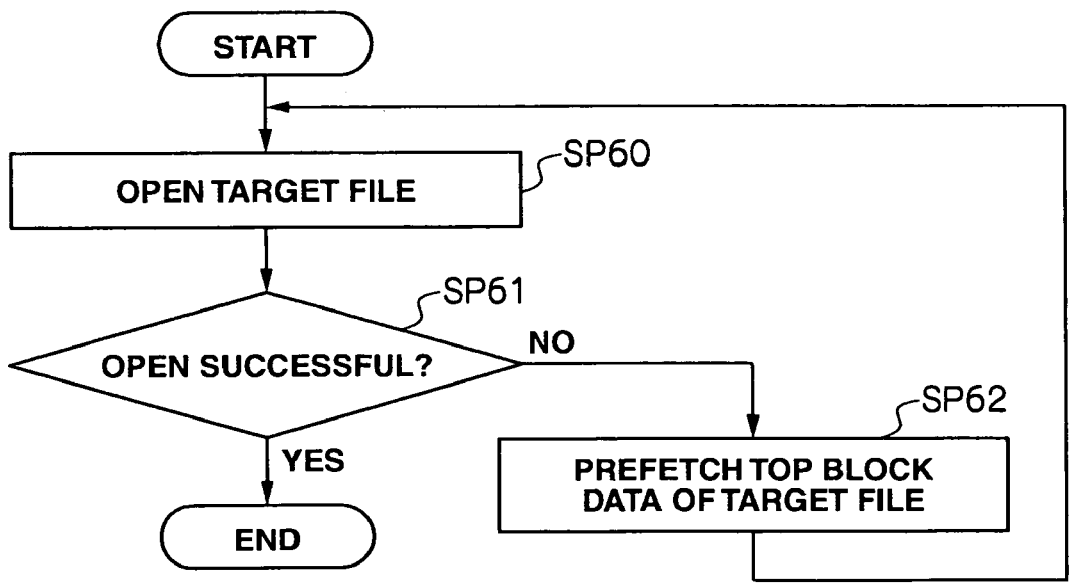
FIG. 11 is a flowchart showing the processing routine of prefetch processing.

Meanwhile, FIG. 11 shows the processing routine of prefetch processing to be executed by the respective prefetch sleds created at step SP46 of the backup processing (FIG. 8). The prefetch sled reads the file data of the corresponding file from the disk device 10 according to the processing routine shown in FIG. 10.

In other words, the prefetch sled foremost refers to the backup list 83 (FIG. 9), and issues a command to the file system processing program 56 for opening the file scheduled to be subject to a data transfer subsequently or after a given count (SP60). The file system processing program 56 that received the foregoing command opens the designated file stored in the disk device 10 by issuing a file open request to the storage I/O program 54.

Subsequently, the prefetch sled determines whether the opening of the file was successful (SP61), and, upon obtaining a positive result in this determination, issues a command to the file system processing program 56 for reading the top block data of the file data of that file (SP62). The file system processing program 56 that received the foregoing command causes the disk device 10 to read the top block data of the designated file and store the read data into the buffer area secured n the memory 22 by issuing a data read request to the storage I/O program 54.

Subsequently, the prefetch sled returns to step SP61, and repeats the same processing until it obtains a negative result at step SP61 (SP60 to SP62-SP60). The top block data of the respective files registered in the backup list 83 is thereby sequentially read according to the alignment sequence of the corresponding entries in the backup list 83 and stored in the buffer area of the memory 22. This is then sequentially transferred to the tape devices 5, 13 of the backup destination according to the backup program 82 at step SP47 of the backup processing explained with reference to FIG. 8.

The prefetch sled ends this prefetch processing when the opening of the file ends in a failure as a result of the reading of the top block data of all files registered in the backup list 83 being complete.

How data is read from the disk device 10 according to the backup processing is now explained with reference to FIG. 9 and FIG. 12.

Figure 12:
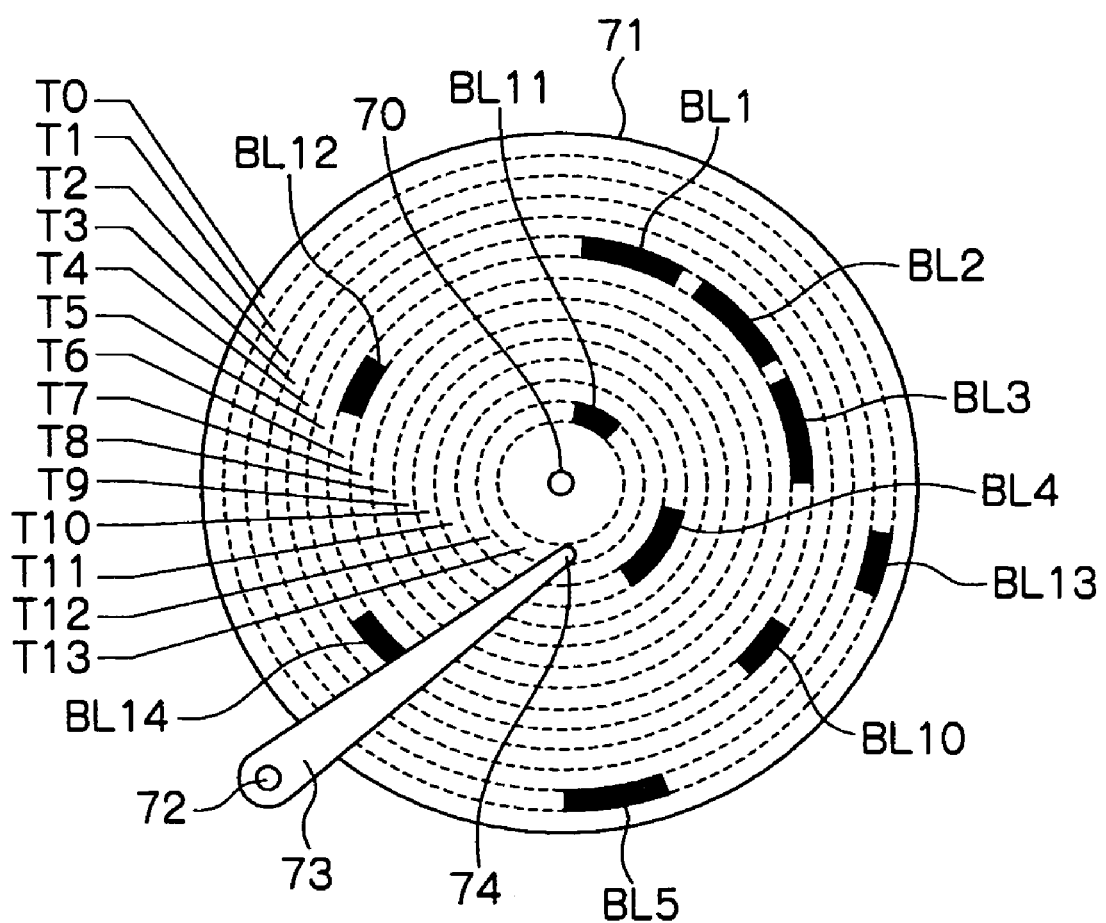
FIG. 12 is a conceptual diagram explaining the operation of a corresponding hard disk drive in a disk device or a storage apparatus during backup processing according to the second embodiment.

In FIG. 12, which shows the same reference numerals for the components corresponding to those illustrated in FIG. 6, let is be assumed that the blocks BL10 to block BL14 respectively store expansion attribute information of files in which file data is respectively stored in the blocks BL1 to BL5.

With a conventional backup method, since the expansion attribute information and data of files and directories (file data and file information in the case of files, and directory information in the case of directories) are backed up according to the alignment sequence of the entries in the backup list 60 that has not been subject to sort processing, for instance, when following the backup list 60 that has not been subject to sort processing as shown in FIG. 9, access in the order from block BL12, block BL3, block BL14, block BL5, block BL11, block BL2, block BL13, block BL4, block BL10, and block BL1 of FIG. 12 will be required.

Specifically, the disk device 10 will perform the operation of foremost moving to the sixth track T6 and reading data of the block BL12, subsequently moving to the fifth track T5 and reading data of the block BL3 and the block BL14, respectively, and thereafter moving to the first track T1 and reading data of the block BL5. Subsequently, the disk device 10 moves to the thirteenth track T13 and reads data of the block BL11, moves to the fifth track T5 and reads data of the block BL2, thereafter moves to the first track T1 and reads data of the block BL13, moves to the eleventh track T11 and reads data of the block BL4, thereafter moves to the fourth track T4 and reads data of the block BL10, and finally moves to the fifth track T5 and reads data of the block BL1.

Meanwhile, with the backup method according to this embodiment, since the processing of rearranging the entries of the backup list 83 of FIG. 9 in order from the entry with the smallest top block address and thereafter reading the data of the respective files according to this backup list, and the processing of reading the expansion attribute information of the respective files and the respective directories are performed in parallel, files will be read in the order from block BL5, block BL1, block BL2, block BL3 and block BL4, and the read request of data to the disk device 10 will include several subsequent files.

For example, when assuming that the prefetch of expansion attribute information of two subsequent files and data of such files is to be performed, a read request for initially reading data of the block BL14 of the fifth track T5 and data of the block BL5 of the first track T1, and data of the block BL10 of the fourth track T4 and data of the block BL1 of the fifth track T5 is issued from the backup program 82 to the disk device 10 via the storage I/O program 54.

Here, although the disk device 10, for instance, causes the magnetic head 74 to move above the fifth track T5 according to the initial read request, since it is known that data must be read from the block BL1 and the block BL14, data is read from one of the blocks BL1, BL14 that can be accessed first, then data is read from the other block BL14, BL1. Thereafter, the disk device 10 causes the magnetic head 74 to above the fourth track T4 that is closer to the fifth track T5 to read data from the block BL10, and thereafter causes the magnetic head 74 to move to the first track T1 and read data of the block BL5.

Subsequently, the disk device 10 is given a read request of data stored in block BL11, block BL2, block BL12 and block BL3 as data of the subsequent file. Here, since the magnetic head 74 is positioned above the first track T1, the disk device 10 moves the magnetic head 74 to the fifth track T5, which is closest to the first track T1, reads data from one of the blocks BL2, BL3 that can be accessed first between the block BL2 and the block BL3, and thereafter reads data from the other block BL3, BL2. The disk device 10 thereafter moves the magnetic head 74 above the sixth track T6, which is closer to the fifth track T5, and reads data from the block BL12, and subsequently moves the magnetic head 74 above the thirteenth track T13 and reads data from the block BL11.

Then, the disk device 10 is given a read request of data stored in block BL13 and block BL4 as data of the file to be subsequently read. Here, since the magnetic head 74 is positioned above the thirteenth track T13, the disk device 10 moves the magnetic head 74 above the eleventh track T11, which is a track that is close to the thirteenth track T13, and reads data from the block BL4, and finally moves the magnetic head 74 to the first track T1 and reads data from the block BL13.

As described above, according to the backup method of this embodiment, since expansion attribute information of the respective files and directories belonging to the file system to be backed up is prefetched, for instance, the travel distance of the magnetic head 74 can be reduced in comparison to cases of successively reading the expansion attribute information and file data of files from the disk device 10. Consequently, it is possible to shorten the time required to read files from the disk device 10 even in cases where the files and directories include expansion attribute information, and the file reading performance and backup performance of the overall computer system 1 can be improved. In addition, since the read processing of the expansion attribute information is performed in parallel with a plurality of expansion attribute information read sleds, the read processing of expansion attribute information of the respective files and directories existing in the file system to be backed up can be performed quickly.

Furthermore, according to the backup method of this embodiment, since the file data of files is prefetched only in the amount of the top block in parallel with the backup process of such files and directories, the time required for reading files from the disk device 10 can be shortened even more. Consequently, the file reading performance and backup performance of the overall computer system 1 can be improved even further. In addition, since the read processing of the expansion attribute information is performed in parallel with a plurality of prefetch sleds, the prefetch processing of the respective files existing in the file system can be performed quickly.

In cases where the expansion attribute information is included, there may be cases where it is necessary to create a directory ahead of a file upon restoration. Thus, in the case of this embodiment, the respective directory search sleds created at step SP42 of the backup processing explained with reference to FIG. 8 sets "0" as the top block address of directories at step SP22 of the directory search processing explained with reference to FIG. 5, and sorts the directories by path name when the value is the same at step SP44 of the backup processing of FIG. 8. Thereby, the directories will be gathered in front of the file, and, since such directories are sorted by path name, it will be possible to set the expansion attribute information of directories in advance, and restores the expansion attribute information accurately even though the update time will be lost.

(3) Other Embodiments

Although the foregoing embodiments explained a case of applying the present invention to the file servers 3, 81, the present invention is not limited thereto, and may be broadly applied to various apparatuses that execute processing of successively reading a plurality of files stored in the disk device.

In addition, although the foregoing embodiments explained a case of loading a function as the read sequence determination unit for determining the read sequence upon reading the respective files from the disk device 10 based on the top block address of the respective storage areas storing the file data of the respective files in the disk device 10, a function as the data reading unit for sequentially reading the file data of the respective files from the disk device 10 according to the read sequence determined with the read sequence determination unit, and a function as the data transfer unit for transferring the file data of the respective files read from the disk device 10 with the data reading unit to the backup destination in a single file server 3, 81, the present invention is not limited to the foregoing configuration, and a part or all of these functions may be loaded in the disk device 10 or the storage apparatus 12, other equipment such as a dedicated server.

Moreover, although the foregoing embodiments explained a case where the backup programs 53, 82 of the file servers 3, 81 rearranged the entries of the backup lists 60, 83 from the entry with the smallest top block address of the file corresponding to that entry, the present invention is not limited to the foregoing configuration, and the entries may also be rearranged from the entry with the largest top block address. In this case, the top block address of directories should be set to "0," which is the smallest value of the physical block address.

Further, although the foregoing embodiments explained a case where the number of directory search sleds as the directory search processing units for executing directory search processing of searching the directory designated as the backup target and acquiring the file to backed up and the top block address of such file, the number of expansion attribute information read sleds as the expansion attribute information reading unit for reading the expansion attribute information per file stored in the disk device 10, which is stored separately from the file data of the file, from the disk device 10 ahead of the file data of such file, and the number of prefetch sleds as the prefetch units for prefetching the file data of files are a fixed value or changed according to the number of files and directories to be backed up, the present invention is not limited to the foregoing configuration, and, for instance, the number may be designated in the backup request to be sent from the backup server 4 to the file server 3.

In addition to the application in file servers, the present invention can be broadly applied to various apparatuses that execute processing of successively reading a plurality of files stored in the disk device.

What is claimed is:

1. A server for providing a backup service of a file system stored in a disk device, the disk device has a plurality of storage areas which are managed by their respective contiguous addresses, the file system includes a plurality of files and a plurality of directories managing the files in a hierarchical fashion, and each of the files and the directories is stored in one or more of the storage areas, the server comprising: a memory storing a backup program; and a CPU executing the backup program; wherein the backup program includes steps of: determining a read sequence for reading the files and directories from the disk device, wherein the read sequence is sorted so that the files are read before the directories, sorted by addresses of the files, and sorted by path names of the directories, wherein the address of each of the files is a beginning physical address of the one or more of the storage areas where the file is stored, reading the files and the directories from the disk device according to the read sequence, and transferring the files and the directories to a backup destination device in an order so that the files and the directories are read from the disk device, wherein the read sequence is sorted by addresses of the files and the directories, and then sorted by the path names of the directories, and wherein the address of each of the directories is the largest address of the storage areas.

2. A server for providing a backup service of a file system stored in a disk device, the disk device has a plurality of storage areas which are managed by their respective contiguous addresses, the file system includes a plurality of files and a plurality of directories managing the files in a hierarchical fashion, and each of the files and the directories is stored in one or more of the storage areas, the server comprising: a memory storing a backup program; and a CPU executing the backup program; wherein the backup program includes steps of: making a list including a plurality of entries where path names and addresses of the files and directories are recorded, wherein the address of each of the files is a beginning physical address of the one or more of the storage areas where the file is stored, wherein the address of each of the directories is the largest address of the storage areas, sorting the entries by addresses of the files and the directories, and then further sorting the directories by their path names wherein the entries are sorted so that the files are read before the directories, reading the files and the directories according to a sequence of the entries, and transferring the files and the directories to a backup destination device in an order so that the files and the directories are read from the disk device.

3. A method for providing a backup service of a file system stored in a disk device, the disk device has a plurality of storage areas which are managed by their respective contiguous addresses, the file system includes a plurality of files and a plurality of directories managing the files in a hierarchical fashion, and each of the files and the directories is stored in one or more of the storage areas, the method comprising: providing a memory storing a backup program; and providing a CPU executing the backup program; wherein the backup program includes steps of: determining a read sequence for reading the files and directories from the disk device, wherein the read sequence is sorted so that the files are read before the directories, sorted by addresses of the files, and sorted by path names of the directories, wherein the address of each of the files is a beginning physical address of the one or more of the storage areas where the file is stored, reading the files and the directories from the disk device according to the read sequence, and transferring the files and the directories to a backup destination device in an order so that the files and the directories are read from the disk device, wherein the read sequence is sorted by addresses of the files and the directories, and then sorted by the path names of the directories, and wherein the address of each of the directories is the largest address of the storage areas.

4. A method for providing a backup service of a file system stored in a disk device, the disk device has a plurality of storage areas which are managed by their respective contiguous addresses, the file system includes a plurality of files and a plurality of directories managing the files in a hierarchical fashion, and each of the files and the directories is stored in one or more of the storage areas, the method comprising: providing a memory storing a backup program; and providing a CPU executing the backup program; wherein the backup program includes steps of: providing a list including a plurality of entries where path names and addresses of the files and directories are recorded, wherein the address of each of the files is a beginning physical address of the one or more of the storage areas where the file is stored, and wherein the address of each of the directories is the largest address of the storage areas, sorting the entries by addresses of the files and the directories, and then further sorting the directories by their path names, wherein the entries are sorted so that the files are read before the directories, reading the files and the directories according to a sequence of the entries, and transferring the files and the directories to a backup destination device in an order so that the files and the directories are read from the disk device.

* * * * *